United States Patent
Kim et al.

(10) Patent No.: US 10,474,543 B1
(45) Date of Patent: Nov. 12, 2019

(54) METHOD AND DEVICE FOR ECONOMIZING COMPUTING RESOURCES TO BE USED DURING A PROCESS OF VERIFICATION OF CONVOLUTIONAL PARAMETERS USING TEST PATTERN TO ENHANCE FAULT TOLERANCE AND FLUCTUATION ROBUSTNESS IN EXTREME SITUATIONS

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradivision, INC. (KR)

( * ) Notice: Subject to any disclaimer, the term of this patent is extended or adjusted under 35 U.S.C. 154(b) by 0 days.

(21) Appl. No.: 16/258,850

(22) Filed: Jan. 28, 2019

(51) Int. Cl.
*G06F 11/14* (2006.01)
*G06K 9/62* (2006.01)
(Continued)

(52) U.S. Cl.
CPC ........ *G06F 11/1476* (2013.01); *G06K 9/3233* (2013.01); *G06K 9/6269* (2013.01);
(Continued)

(58) Field of Classification Search
CPC .... G06K 9/685; G06K 9/3233; G06K 9/6269; G06T 5/20; G06T 5/50; G06T 7/11;
(Continued)

(56) References Cited

U.S. PATENT DOCUMENTS 10,108,850 B1 * 10/2018 Das .................. G06K 9/00288
2018/0122114 A1 * 5/2018 Luan ..................... G06T 7/194

OTHER PUBLICATIONS

Dreossi, et al. "Systematic Testing of Convolutional Neural Networks for Autonomous Driving", pp. 1-5, International on Machine Learning. (Year: 2017).*

(Continued)

*Primary Examiner* — Daniel G Mariam
(74) *Attorney, Agent, or Firm* — FisherBroyles, LLP; Susan M. Oiler

(57) ABSTRACT

A method for economizing computing resources and verifying an integrity of parameters of a neural network by inserting test pattern into a background area of an input image is provided for fault tolerance, fluctuation robustness in extreme situations, functional safety on the neural network, and an annotation cost reduction. The method includes: a computing device (a) generating t-th background prediction information of a t-th image by referring to information on each of a (t−2)-th image and a (t−1)-th image; (b) inserting the test pattern into the t-th image by referring to the t-th background prediction information, to thereby generate an input for verification; (c) generating an output for verification from the input for verification; and (d) determining the integrity of the neural network by referring to the output for verification and an output for reference. According to the method, a data compression and a computation reduction are achieved.

24 Claims, 6 Drawing Sheets

(51) Int. Cl.
| | |
|---|---|
| *G06K 9/68* | (2006.01) |
| *G06T 5/20* | (2006.01) |
| *G06T 7/194* | (2017.01) |
| *G06T 7/11* | (2017.01) |
| *G06T 5/50* | (2006.01) |
| *G06K 9/32* | (2006.01) |

(52) U.S. Cl.
CPC ............... *G06K 9/685* (2013.01); *G06T 5/20* (2013.01); *G06T 5/50* (2013.01); *G06T 7/11* (2017.01); *G06T 7/194* (2017.01); *G06T 2207/20084* (2013.01)

(58) Field of Classification Search
CPC ........... G06T 7/194; G06T 2207/20084; G06F 16/2365; G06F 21/44; G06F 21/64; G06F 11/002; G06F 11/004; G06F 11/008; G06F 11/3604; G06N 20/00
USPC ........................................ 382/155, 173, 218
See application file for complete search history.

(56) References Cited

OTHER PUBLICATIONS

Pei, et al. "Towards Practical Verification of Machine Learning: The Case of Computer Vision Systems", pp. 1-16, Columbia University. (Year: 2017).*

* cited by examiner

METHOD AND DEVICE FOR ECONOMIZING COMPUTING RESOURCES TO BE USED DURING A PROCESS OF VERIFICATION OF CONVOLUTIONAL PARAMETERS USING TEST PATTERN TO ENHANCE FAULT TOLERANCE AND FLUCTUATION ROBUSTNESS IN EXTREME SITUATIONS

FIELD OF THE DISCLOSURE

The present disclosure relates to a method and a computing device for use with an autonomous vehicle; and more particularly, to the method and the computing device for economizing computing resources and verifying an integrity of parameters of a neural network by using a test pattern.

BACKGROUND OF THE DISCLOSURE

Deep Convolution Neural Networks (Deep CNNs) are at the heart of the remarkable development in deep learning. CNNs have already been used in the 90's to solve the problems of character recognition, but their use has become as widespread as it is now thanks to recent research. These CNNs won the 2012 ImageNet image classification tournament, crushing other competitors. Then, the convolution neural network became a very useful tool in the field of the machine learning.

The CNNs are sometimes used in a field of autonomous vehicle. That is, the vehicle can be safely driven via a function of detecting obstacles, free spaces, and the like by analyzing images obtained with a camera attached to the vehicle.

It is security of the CNNs for the autonomous driving that should be considered to be very important when the CNNs are actually used for the autonomous driving. As the autonomous vehicle with heavy weight moves at high speeds, the risk is high in case of an erroneous driving. Specifically, if a hacker with a bad intention falsifies parameters of the CNNs for the autonomous driving by hacking the CNNs, the autonomous vehicle may be used for terrorism.

Therefore, it is necessary to verify whether the parameters of the CNN during a test process are same as those of the CNN at the time when the CNN has completed its learning process. Researches so far have been focused mainly on how many effects the CNNs can have on driving the vehicle, and there is little research on how to maintain the security.

Further, even if a surveillance system maintains the security of the CNN by using conventional technologies in other fields, there are disadvantages that a main function of the CNN may deteriorate due to a lot of additional operations besides operations of the CNN.

SUMMARY OF THE DISCLOSURE

It is an object of the present disclosure to solve all the aforementioned problems.

It is another object of the present disclosure to verify an integrity of one or more parameters of a CNN by using at least one test pattern through a method for economizing computational resources in the verification process while the CNN maintains a performance of its main function as well.

In accordance with one aspect of the present disclosure, there is provided a method for economizing one or more computing resources and verifying an integrity of one or more parameters of a neural network by inserting at least one test pattern into at least one background area of at least one input image, including steps of: (a) a computing device, if information on each of a (t−2)-th image and a (t−1)-th image respectively corresponding to (t−i2)-th frame and (t−i1)-th frame of a video is acquired, instructing at least one background prediction unit to generate t-th background prediction information of a t-th image by referring to the information on said each of the (t−2)-th image and the (t−1)-th image; (b) the computing device, if the t-th image is acquired, instructing at least one pattern insertion unit to insert the test pattern into the t-th image by referring to the t-th background prediction information, to thereby generate at least one input for verification; (c) the computing device instructing the neural network to generate at least one output for verification by applying one or more convolution operations to the input for verification; and (d) the computing device instructing at least one verification unit to determine the integrity of the neural network by referring to the output for verification and at least one output for reference corresponding to the test pattern.

As one example, at the step of (a), the computing device instructs the background prediction unit to predict a location of a center of a background, corresponding to a background included in the (t−1)-th image and the (t−1)-th image, in the t-th image by referring to (t−2)-th background center information on the t−2th image and (t−1)-th background center information on the (t−1)-th image, to thereby generate the t-th background prediction information.

As one example, at the step of (a), the computing device instructs the background prediction unit to generate difference information between (i) coordinates of an actual center of at least one (t−2)-th specific background area in the (t−2)-th image and (ii) coordinates of an actual center of at least one (t−1)-th specific background area, corresponding to the (t−2)-th specific background area, in the (t−1)-th image, and the computing device instructs the background prediction unit to generate the t-th background prediction information by referring to the difference information and the coordinates of the actual center of the (t−1)-th specific background area, wherein the coordinates of the actual center of the (t−2)-th specific background area are included in the (t−2)-th background center information, and wherein the coordinates of the actual center of the (t−1)-th specific background area is included in the (t−1)-th background center information.

As one example, at the step of (b), the computing device instructs the pattern insertion unit to insert the test pattern into the t-th image so that coordinates of a center of the test pattern is located at coordinates of a predicted center of at least one t-th specific background area in the t-th image, wherein the t-th specific background area corresponds to each of the (t−2)-th specific background area and the (t−1)-th specific background area which are respectively included in the (t−2)-th image and the (t−1)-th image, and wherein the coordinates of the predicted center of the t-th specific background area is included in the t-th background prediction information.

As one example, at the step of (b), the computing device instructs the pattern insertion unit to add at least one zero pattern, whose width corresponds to a size of a convolution kernel of the neural network, to one or more boundaries of the test pattern so that the test pattern does not affect one or more operations applied to the t-th image by the neural network.

As one example, at the step of (d), the computing device instructs the verification unit to compare values included in the output for reference and values included in at least one specific area, corresponding to the test pattern, among a whole area of the output for verification, and, if at least one of the values included in the specific area is different from its corresponding value included in the output for reference, the computing device instructs the verification unit to determine that at least part of one or more parameters of the neural network has been changed.

As one example, before the step of (a), if a security level of the computing device is higher than a threshold level, the neural network has generated the output for reference by applying one or more convolution operations to the test pattern.

As one example, after the step of (c), the method further includes a step of: (e) the computing device instructing at least one center calculation unit to calculate coordinates of an actual center of at least one background area in the t-th image.

As one example, if a (t+1)-th image corresponding to a (t+i3)-th frame in the video is acquired, the coordinates of the actual center of the background area in the t-th image is used when the computing device instructs the background prediction unit to generate (t+1)-th background prediction information on the (t+1)-th image.

In accordance with another aspect of the present disclosure, there is provided a method for economizing one or more computing resources and verifying an integrity of one or more parameters of a convolution unit by inserting at least one test pattern into at least one integrated image generated from at least one input image, including steps of: (a) a computing device, if the input image is acquired, instructing a target region estimating network to estimate a first target region to an n-th target region on the input image or its one or more resized images, wherein one or more corresponding target objects are estimated as located on each of the first target region to the n-th target region; (b) the computing device instructing at least one image-manipulating network to generate a first manipulated image to an n-th manipulated image, from the input image or its resized images, each of which corresponds to each of the first target region to the n-th target region and to generate the integrated image by concatenating the first manipulated image to the n-th manipulated image, wherein, at the time of the concatenation, the test pattern is inserted between at least some adjacent manipulated images among the first manipulated image to the n-th manipulated image; (c) the computing device instructing the convolution unit to generate at least one feature map by applying the convolution operations to the integrated image; and (d) the computing device instructing at least one verification unit to verify the integrity of the convolution unit by referring to values included in at least one area, corresponding to the test pattern, on the feature map and values included in at least one output for reference corresponding to a result of one or more operations applied to the test pattern by the convolution unit.

As one example, after the step of (c), the method further includes a step of: (e) the computing device, if the feature map is acquired, instructing at least one object detector to generate class information and location information on one or more objects in the input image.

As one example, at the step of (b), at least one zero pattern is located between the test pattern and each of its adjacent manipulated images in the integrated image, and wherein a width of the zero pattern corresponds to a size of a convolution kernel of the neural network.

In accordance with still another aspect of the present disclosure, there is provided a computing device for economizing one or more computing resources and verifying an integrity of one or more parameters of a neural network by inserting at least one test pattern into at least one background area of at least one input image, including: at least one memory that stores instructions; and at least one processor configured to execute the instructions to perform processes of: (I) if information on each of a (t−2)-th image and a (t−1)-th image respectively corresponding to (t−i2)-th frame and (t−i1)-th frame of a video is acquired, instructing at least one background prediction unit to generate t-th background prediction information of a t-th image by referring to the information on said each of the (t−2)-th image and the (t−1)-th image, (II) if the t-th image is acquired, instructing at least one pattern insertion unit to insert the test pattern into the t-th image by referring to the t−th background prediction information, to thereby generate at least one input for verification, (III) instructing the neural network to generate at least one output for verification by applying one or more convolution operations to the input for verification, and (IV) instructing at least one verification unit to determine the integrity of the neural network by referring to the output for verification and at least one output for reference corresponding to the test pattern.

As one example, at the process of (I), the processor instructs the background prediction unit to predict a location of a center of a background, corresponding to a background included in the (t−1)-th image and the (t−1)-th image, in the t-th image by referring to (t−2)-th background center information on the t−2th image and (t−1)-th background center information on the (t−1)-th image, to thereby generate the t-th background prediction information.

As one example, at the process of (I), the processor instructs the background prediction unit to generate difference information between (i) coordinates of an actual center of at least one (t−2)-th specific background area in the (t−2)-th image and (ii) coordinates of an actual center of at least one (t−1)-th specific background area, corresponding to the (t−2)-th specific background area, in the (t−1)-th image, and the processor instructs the background prediction unit to generate the t-th background prediction information by referring to the difference information and the coordinates of the actual center of the (t−1)-th specific background area, wherein the coordinates of the actual center of the (t−2)-th specific background area are included in the (t−2)-th background center information, and wherein the coordinates of the actual center of the (t−1)-th specific background area is included in the (t−1)-th background center information.

As one example, at the process of (II), the processor instructs the pattern insertion unit to insert the test pattern into the t-th image so that coordinates of a center of the test pattern is located at coordinates of a predicted center of at least one t-th specific background area in the t-th image, wherein the t-th specific background area corresponds to each of the (t−2)-th specific background area and the (t−1)-th specific background area which are respectively included in the (t−2)-th image and the (t−1)-th image, and wherein the coordinates of the predicted center of the t-th specific background area is included in the t-th background prediction information.

As one example, at the process of (II), the processor instructs the pattern insertion unit to add at least one zero pattern, whose width corresponds to a size of a convolution kernel of the neural network, to one or more boundaries of the test pattern so that the test pattern does not affect one or more operations applied to the t-th image by the neural network.

As one example, at the process of (IV), the processor instructs the verification unit to compare values included in the output for reference and values included in at least one specific area, corresponding to the test pattern, among a whole area of the output for verification, and, if at least one of the values included in the specific area is different from its corresponding value included in the output for reference, the processor instructs the verification unit to determine that at least part of one or more parameters of the neural network has been changed.

As one example, before the process of (I), if a security level of the processor is higher than a threshold level, the neural network has generated the output for reference by applying one or more convolution operations to the test pattern.

As one example, after the process of (III), the processor further performs a process of: (V) instructing at least one center calculation unit to calculate coordinates of an actual center of at least one background area in the t-th image.

As one example, if a (t+1)-th image corresponding to a (t+i3)-th frame in the video is acquired, the coordinates of the actual center of the background area in the t-th image is used when the processor instructs the background prediction unit to generate (t+1)-th background prediction information on the (t+1)-th image.

In accordance with still yet another aspect of the present disclosure, there is provided a computing device for economizing one or more computing resources and verifying an integrity of one or more parameters of a convolution unit by inserting at least one test pattern into at least one integrated image generated from at least one input image, including: at least one memory that stores instructions; and at least one processor configured to execute the instructions to perform processes of: (I) if the input image is acquired, instructing a target region estimating network to estimate a first target region to an n-th target region on the input image or its one or more resized images, wherein one or more corresponding target objects are estimated as located on each of the first target region to the n-th target region, (II) instructing at least one image-manipulating network to generate a first manipulated image to an n-th manipulated image, from the input image or its resized images, each of which corresponds to each of the first target region to the n-th target region and to generate the integrated image by concatenating the first manipulated image to the n-th manipulated image, wherein, at the time of the concatenation, the test pattern is inserted between at least some adjacent manipulated images among the first manipulated image to the n-th manipulated image, (III) instructing the convolution unit to generate at least one feature map by applying the convolution operations to the integrated image, and (IV) instructing at least one verification unit to verify the integrity of the convolution unit by referring to values included in at least one area, corresponding to the test pattern, on the feature map and values included in at least one output for reference corresponding to a result of one or more operations applied to the test pattern by the convolution unit.

As one example, after the process of (III), the processor further performs a process of: (V) if the feature map is acquired, instructing at least one object detector to generate class information and location information on one or more objects in the input image.

As one example, at the process of (II), at least one zero pattern is located between the test pattern and each of its adjacent manipulated images in the integrated image, and wherein a width of the zero pattern corresponds to a size of a convolution kernel of the neural network.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION

Figure 1:
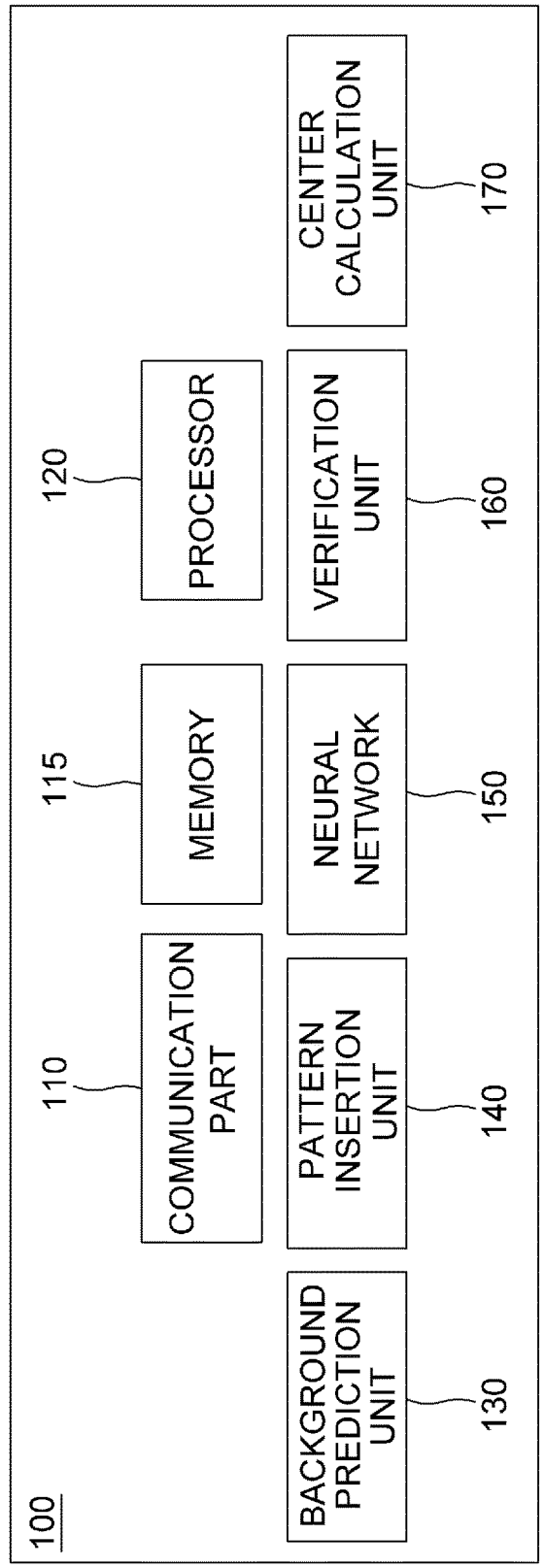
FIG. 1 is a drawing schematically illustrating a configuration of a computing device capable of performing a method for economizing one or more computing resources and verifying an integrity of one or more parameters of a neural network by inserting at least one test pattern into at least one background area of at least one input image in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a computing device capable of performing a method for economizing one or more computing resources and verifying an integrity of one or more parameters of a neural network by inserting at least one test pattern into at least one background area of at least one input image in accordance with one example embodiment of the present disclosure.

By referring to FIG. 1, the computing device 100 may include at least one background prediction unit 130, at least one pattern insertion unit 140, at least one neural network 150, at least one verification unit 160, and at least one center calculation unit 170, which are components to be described later. Inputting/outputting processes and operation processes of the background prediction unit 130, the pattern insertion unit 140, the neural network 150, the verification unit 160, and the center calculation unit 170 may be performed by at least one communication part 110 and at least one processor 120 respectively. However, detailed communication schematics between the communication part 110 and the processor 120 are omitted in FIG. 1. Herein, at least one memory 115 may have previously stored instructions to be described later, and the processor 120 may be configured to execute the instructions stored in the memory 115, wherein the processor 120 may implement the present disclosure by performing processes below. Though the computing device 100 is described as above, the computing device 100 does not preclude inclusion of at least one integrated processor, which is an integrated form of a medium, the processor, and the memory for practicing the disclosure.

The overall configuration of the computing device 100 has been described above. Hereinafter, the method for economizing the computing resources and verifying the integrity of the parameters of the neural network by inserting the test pattern into the background area of the input image in accordance with one example embodiment of the present disclosure will be described by referring to FIG. 2.

Figure 2:
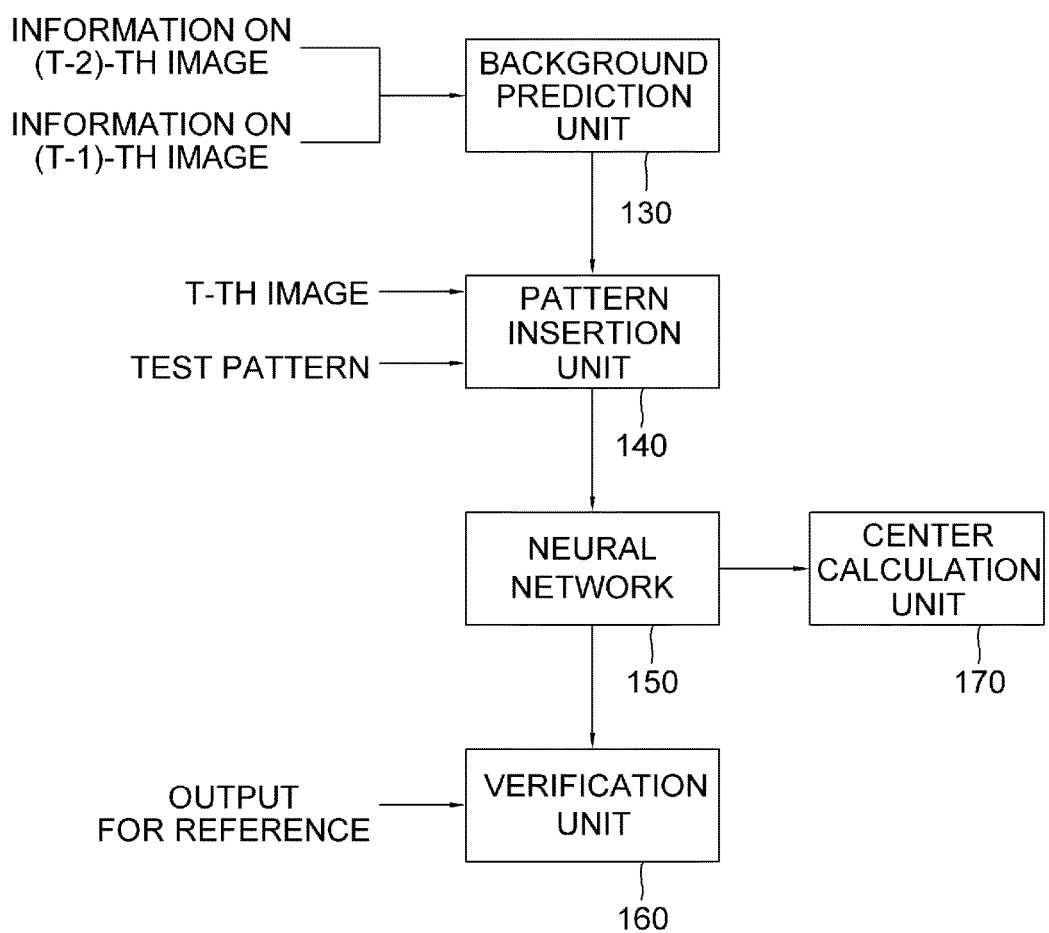
FIG. 2 is a drawing schematically illustrating a flow chart of the method for economizing the computing resources and verifying the integrity of the parameters of the neural network by inserting the test pattern into the background area of the input image in accordance with one example embodiment of the present disclosure.

FIG. 2 is a drawing schematically illustrating a flow chart of the method for economizing the computing resources and verifying the integrity of the parameters of the neural network by inserting the test pattern into the background area of the input image in accordance with one example embodiment of the present disclosure.

By referring to FIG. 2, it can be seen that, if each piece of information on each of a (t−2)-th image and a (t−1)-th image is acquired, they may be inputted to the background prediction unit 130. Next, if t-th background prediction information is outputted from the background prediction unit 130, the pattern insertion unit 140 may generate at least one input for verification by using a t-th image and the test pattern, and the verification unit 160 and the center calculation unit 170 may acquire at least one output for verification, which is outputted from the neural network 150 by applying one or more convolution operations to the input for verification.

Specifically, if each piece of the information on each of the (t−2)-th image and the (t−1)-th image respectively corresponding to (t−i2)-th frame and (t−i1)-th frame of the video is acquired, the computing device 100 may instruct the background prediction unit 130 to generate the t-th background prediction information of the t-th image by referring to said each piece of the information on each of the (t−2)-th image and the (t−1)-th image. Each of i2 and i1 is an arbitrary integer, and i2 may be larger than i1. The t-th background prediction information may be generated by using each piece of the information on each of the (t−2)-th image and the (t−1)-the image. A movement of the background area may be predicted by referring to images corresponding to previous frames, e.g., the (t−i2)-th frame and the (t−i1)-th frame.

That is, the computing device 100 may instruct the background prediction unit 130 to predict a location of a center of a background in the t-th image, corresponding to the background included in the (t−1)-th image and the (t−1)-th image, by referring to (t−2)-th background center information on the (t−2)-th image and (t−1)-th background center information on the (t−1)-th image. Thus, the t-th background prediction information may be generated.

For example, it may be assumed that at least one (t−2)-th specific background area is included in the (t−2)-th image and at least one (t−1)-th specific background area, corresponding to the (t−2)-th specific background area, is included in the (t−1)-th image. Herein, the (t−2)-th specific background area and the (t−1)-th specific background area may show a same area at relatively different positions as the camera moves.

Also, the computing device 100 may instruct the background prediction unit 130 to generate difference information between coordinates of an actual center of the (t−2)-th specific background area and coordinates of an actual center of the (t−1)-th specific background area, wherein the coordinates of the actual center of the (t−2)-th specific background area are included in the (t−2)-th background center information, and wherein the coordinates of the actual center of the (t−1)-th specific background area is included in the (t−1)-th background center information. The difference information may include information on how much a three-dimensional region corresponding to the (t−2)-th specific background area has moved between the (t−i2)-th frame and the (t−i1)-th frame. Then, the t-th background prediction information may be generated by referring to the difference information and the coordinates of the actual center of the (t−1)-th specific background area. As one example, the t-th background prediction information may be generated by adding the difference information and the coordinates of the actual center of the (t−1)-th specific background area. That is, it may be predicted that the three-dimensional region corresponding to the (t−2)-th specific background area has moved between the (t−i1)-th frame and the t-th frame as much as it moved between the (t−i2)-th frame and the (t−i1)-th frame. The t-th background prediction information may include coordinates of a predicted center of at least one t-th specific background area, corresponding to the (t−2)-th specific background area and the (t−1)-th specific background area, in the t-th image.

As another example, the t-th background prediction information may be generated by multiplying a ratio of i1 to i2−i1 and the difference information and then by adding a result of the multiplication to the coordinates of the actual center of the (t−1)-th specific background area. This is because the t-th prediction background information may be more accurately calculated, when time gaps between frames are different.

Figure 3:
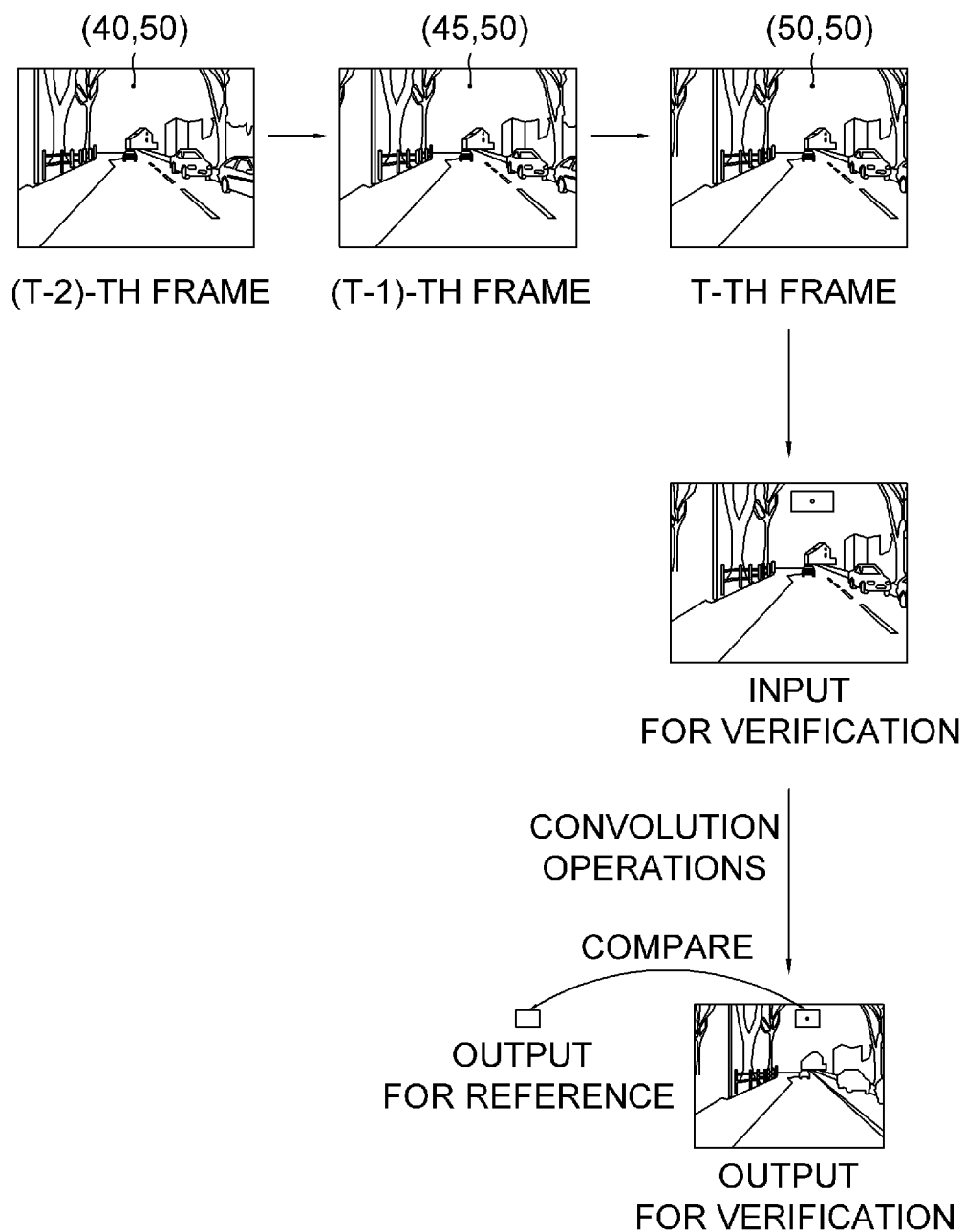
FIG. 3 is a drawing schematically illustrating a process of generating t-th background prediction information, an input for verification, and an output for verification by using the method for economizing the computing resources and verifying the integrity of the parameters of the neural network by inserting the test pattern into the background area of the input image in accordance with one example embodiment of the present disclosure.

FIG. 3 is referred to as an example of generating the t-th background prediction information as stated above.

FIG. 3 is a drawing schematically illustrating a process of generating the t-th background prediction information, the input for verification, and the output for verification by using the method for economizing the computing resources and verifying the integrity of the parameters of the neural network by inserting the test pattern into the background area of the input image in accordance with one example embodiment of the present disclosure.

In FIG. 3, a process of generating the t-th background prediction information is illustrated in case i2 is 2 and i1 is 1. In each image represented in FIG. 3, each specific background area may be each area corresponding to the sky. Herein, the coordinates of the actual center of the (t−2)-th specific background area is (40, 50) in an image corresponding to the (t−2)-th frame, and the coordinates of the actual center of the (t−1)-th specific background area is (45, 50) in an image corresponding to the (t−1)-th frame. In this case, the difference information may be calculated as (5, 0). Accordingly, coordinates of an actual center of the t-th specific background area may be calculated as (50, 50) by adding the difference information to (45, 50), i.e., the coordinates of the actual center of the (t−1)-th specific background area.

If the t-th background prediction information is generated as above, the computing device 100 may instruct the pattern insertion unit 140 to insert the test pattern into the t-th image so that coordinates of a center of the test pattern is located at the coordinates of the predicted center of the t-th specific background area in the t-th image, wherein the t-th specific background area corresponds to each of the (t−2)-th specific background area and the (t−1)-th specific background area, and wherein the coordinates of the predicted center of the t-th specific background area is included in the t-th background prediction information. As one example, the test pattern may be inserted such that the center of the test pattern is located at coordinates of the predicted center. Also, at least one zero pattern, whose width corresponds to a size of a convolution kernel of the neural network 150, may be added to one or more boundaries of the test pattern.

The addition of the test pattern and the zero pattern may be needed to prevent damaging information on objects on the t-th image. The reason of locating the coordinates of the center of the test pattern at the coordinates of the predicted center of the t-th specific background area may be because the information on the objects on the t-th image is not damaged when the test pattern is located in the background. The zero pattern may be needed as a buffer to prevent the test pattern from affecting the convolution operations on other areas, since multiple values of adjacent pixels are used simultaneously in the convolution operations.

Next, the computing device 100 may instruct the neural network 150 to generate the output for verification by applying the convolution operations to the input for verification. The neural network 150 may have been learned since it is an object of the present disclosure to verify the integrity of the parameters of the neural network. The output for verification may include at least one area for verification corresponding to the test pattern and at least one area for detection corresponding to at least one area excluding the test pattern and the zero pattern among a whole area of the t-th image.

If the output for verification is generated as stated, the computing device 100 may instruct the verification unit 160 to determine the integrity of the neural network 150 by referring to the output for verification and at least one output for reference corresponding to the test pattern. That is, values included in the output for reference and values included in the area for verification may be compared, and then, if at least one of the values included in the area for verification is different from its corresponding value included in the output for reference, it can be determined that at least part of the parameters of the neural network 150 has been changed.

Herein, the neural network 150 may have generated the output for reference by applying the convolution operations to the test pattern when a security level of the computing device 100 is higher than a threshold level. If a result of the convolution operations on the test pattern when the security level was higher than the threshold level is different from a current result of the convolution operations on the test pattern, it may be determined that there are an error in the parameters of the neural network. According to this method, the integrity of the parameters of the neural network 150 may be verified.

The computing device 100 may instruct the center calculation unit 170 to calculate the coordinates of the actual center of the t-th specific background area in the t−th image, in parallel with such a process of the verification unit 160. If a (t+1)-th image is acquired later as a (t+i3)-th frame, the coordinate of the actual center of the t-th specific background area may be used as above while the computing device 100 instructs the background prediction unit 130 to generate (t+1)-th background prediction information on the (t+1)-th image.

Further, the computing device 100 may perform its main function, e.g., image segmentation, object detection, and the like, by using the area for detection in the output for verification, in parallel with processes performed by the verification unit 160 and the center calculation unit 170 as explained above.

The method for economizing the computing resources and verifying the integrity of the parameters of the neural network by inserting the test pattern into the background area of the input image in accordance with one example embodiment of the present disclosure has been described above. Hereinafter, another embodiment of the present disclosure will be described.

Figure 4:
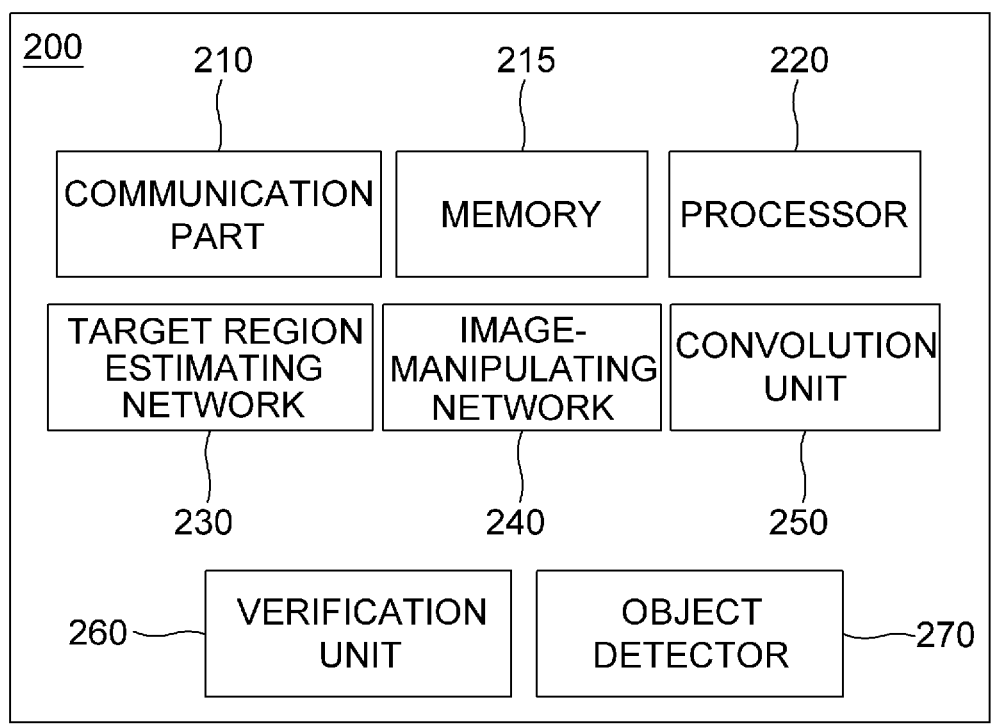
FIG. 4 is a drawing schematically illustrating a configuration of a computing device performing a method for economizing the computing resources and verifying the integrity of one or more parameters of a convolution unit by inserting at least one test pattern into at least one integrated image generated from at least one input image in accordance with another example embodiment of the present disclosure.

FIG. 4 is a drawing schematically illustrating a configuration of a computing device performing a method for economizing the computing resources and verifying the integrity of one or more parameters of a convolution unit by inserting the test pattern into at least one integrated image generated from at least one input image in accordance with another example embodiment of the present disclosure.

By referring to FIG. 4, the computing device 200 may include at least one target region estimating network 230, at least one image-manipulating network 240, the convolution unit 250, at least one verification unit 260, and at least one object detector 270, which are components to be described later. Inputting/outputting processes and operation processes of the target region estimating network 230, the image-manipulating image 240, the verification unit 260, and the object detector 270 may be performed by at least one communication part 210 and at least one processor 220 respectively. However, detailed communication schematics between the communication part 210 and the processor 220 are omitted in FIG. 4. Herein, at least one memory 215 may have previously stored instructions to be described later, and the processor 220 may be configured to execute the instructions stored in the memory 215, wherein the processor 220 may implement the present disclosure by performing processes below. Though the computing device 200 is described as above, the computing device 200 does not preclude at least one integrated processor, which is an integrated form of a medium, the processor, and the memory for practicing the disclosure.

The overall configuration of the computing device 200 has been described above. Hereinafter, the method for economizing the computing resources and verifying the integrity of the parameters of the convolution unit by inserting the test pattern into the integrated image generated from the input image in accordance with another example embodiment of the present disclosure will be described by referring to FIG. 5.

Figure 5:
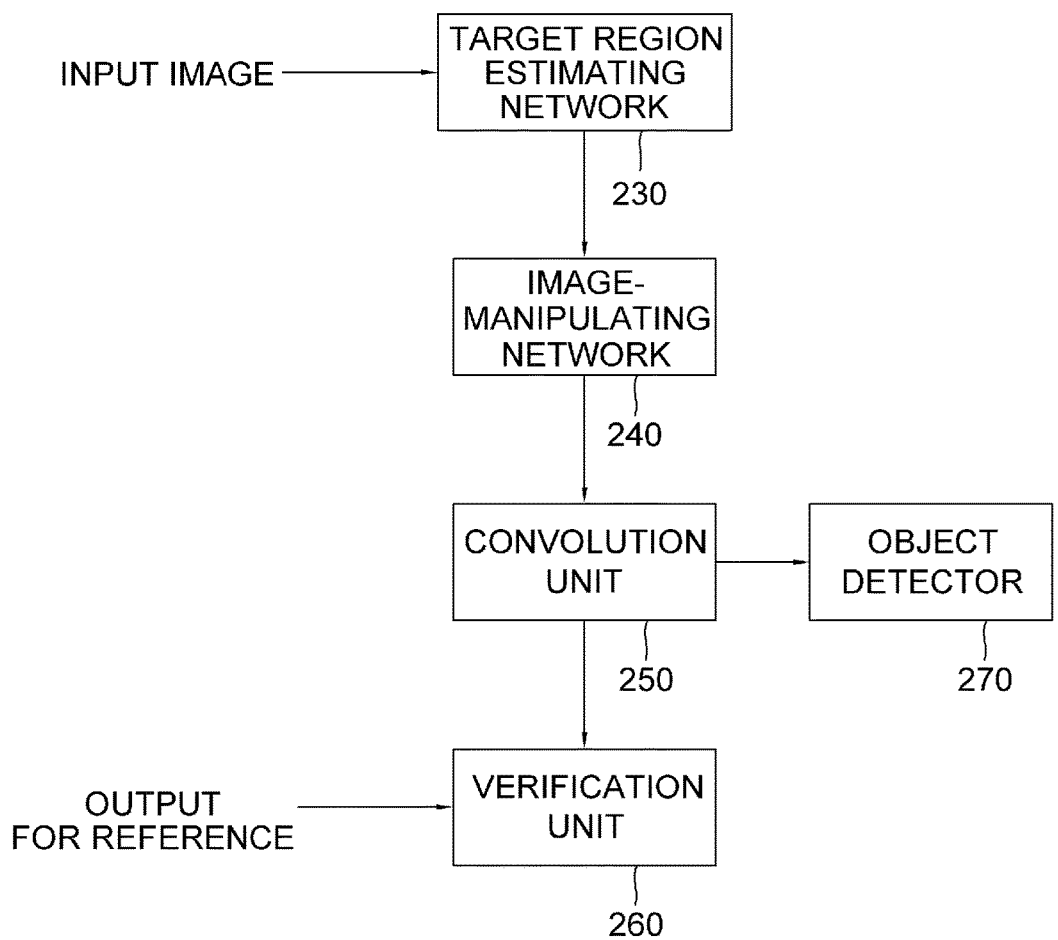
FIG. 5 is a drawing schematically illustrating a flow chart of the method for economizing the computing resources and verifying the integrity of the parameters of the convolution unit by inserting the test pattern into the integrated image generated from the input image in accordance with another example embodiment of the present disclosure.

FIG. 5 is a drawing schematically illustrating a flow chart of the method for economizing the computing resources and verifying the integrity of the parameters of the convolution unit by inserting the test pattern into the integrated image generated from the input image in accordance with another example embodiment of the present disclosure.

By referring to FIG. 5, it can be seen that, if the input image is inputted to the target region estimating network 230, at least one feature map may be generated through the target region estimating network 230, the image-manipulating network 240, and the convolution unit 250. Also, it can be seen that the feature map and at least one output for reference are inputted to the verification unit 260, and that the feature map is inputted to the object detector 270. Such processes are described below.

First of all, if the input image is acquired, the computing device 200 may instruct the target region estimating network 230 to estimate a first target region to an n-th target region on the input image or its one or more resized images, wherein one or more corresponding target objects are estimated as located on each of the first target region to the n-th target region.

Herein, the first target region to the n-th target region may correspond to multiple different target objects among the target objects in the input image, or correspond to at least one identical target object in multiple images with different sizes. Also, the first target region to the n-th target region may correspond to target objects estimated as located in each of images included in the image pyramid including at least part of the input image and its resized images. The target objects may refer to objects that need to be detected on the input image.

Therefore, the target region estimating network 230 may search for the first target region to the n-th target region, corresponding to areas, where a first target object to an n-th target object are estimated as located, on the input image, or may search for each of the first target region to the n-th target region, corresponding to areas where at least one specific target object is estimated as located, on each of a first resized image to an n-th resized image which are derived from the input image.

Also, the target region estimating network 230 may search for a specific target region, corresponding to a specific area where a single target object is estimated as located, on the input image, and may search for each of the first target region to the n-th target region, corresponding to the specific area where the single target object is estimated as located, on each of the first resized image to the n-th resized image which are derived from the input image.

Additionally, if there are multiple target objects on the input image, the target regions corresponding to the target objects may be estimated for each of the resized images by the target region estimating network 230.

A process of obtaining such target regions may be explained as follows. First, the target region estimating network 230 may calculate each scale histogram for each of the input image or its resized images and estimate the first target region to the n-th target region corresponding to scale proposals where the corresponding target objects are estimated as located, by referring to the scale histogram.

Also, the target region estimating network 230 may perform segmentation on each of the input image or its resized images, may set seeds to search for the target regions based on the segmentation, and may estimate the first target region to the n-th target region by referring to integrated regions into which small target regions are repeatedly integrated.

As another example, the target region estimating network 230 may identify foregrounds on the input image by a foreground segmentation and may set areas, where target objects are estimated as located and whose sizes are estimated as including the target objects, as the first target region to the n-th target region by referring to the identified foregrounds.

Further, the target region estimating network 230 may use a saliency detection method for setting the first target region to the n-th target region. Four methods of setting the target regions have been described above, but the present disclosure is not limited thereto. Also, any method of estimating target regions in the input image can be used.

If the first target region to the n-th target region are generated as stated, the computing device 200 may instruct the image-manipulating network 240 to generate a first manipulated image to an n-th manipulated image, from the input image or its resized images, each of which corresponds to each of the first target region to the n-th target region.

Herein, the computing device 200 may instruct the image-manipulating network 240 to generate the first manipulated image to the n-th manipulated image by cropping one or more regions corresponding to the first target region to the n-th target region on the input image or its resized images, or may instruct the image-manipulating network 240 to generate the first manipulated image to the n-th manipulated image by cropping and resizing one or more regions corresponding to the first target region to the n-th target region on the input image or its resized images.

Then, the computing device 200 may instruct the image-manipulating network 240 to generate the integrated training image by concatenating the first manipulated image to the n-th manipulated image. Herein, the computing device 200 may instruct the image-manipulating network 240 to adjust at least one of widths and lengths of the first manipulated image to the n-th manipulated image to be identical, and concatenate the first adjusted manipulated image to the n-th adjusted manipulated image in a direction of the widths or the lengths which are adjusted to be identical. In the above concatenation process, the computing device 200 may instruct the image-manipulating network 240 to add at least one test pattern in-between each pair comprised of two neighboring adjusted manipulated images which are concatenated, among the first adjusted manipulated image to the n-th adjusted manipulated image. Also, at least one zero pattern may be located between the test pattern and each of its adjacent manipulated images in the integrated image, and a width of the zero pattern corresponds to a size of a convolution kernel of the neural network.

Figure 6:
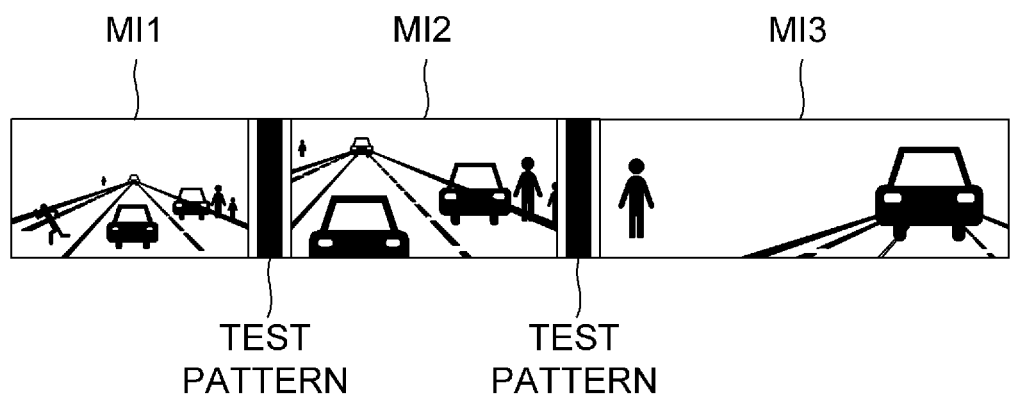
FIG. 6 is a drawing exemplarily illustrating the integrated image used in the method for economizing the computing resources and verifying the integrity of the parameters of the convolution unit by inserting the test pattern into the integrated image generated from the input image in accordance with another example embodiment of the present disclosure.

Each of the first to the n-th manipulated images may need at least one zero padding region, i.e., the zero pattern, of a certain size in order not to affect a result of the convolution operations on each other. Herein, amount of operations, as well as storage, may be reduced by inserting the test pattern into an area where the zero padding region is to be inserted. Also, the test pattern may not affect each of results of the convolution operations on the first to the n-th manipulated images by additionally inserting the zero padding region to both sides of the test pattern. FIG. 6 is referred to so as to explain an example of this.

FIG. 6 is a drawing exemplarily illustrating the integrated image used in the method for economizing the computing resources and verifying the integrity of the parameters of the convolution unit by inserting the test pattern into the integrated image generated from the input image in accordance with another example embodiment of the present disclosure.

By referring to FIG. 6, it can be seen that the test pattern and the zero padding region are inserted between manipulated images. The test pattern and the zero padding region may be located in-between one pair or multiple pairs of the two neighboring manipulated images in the integrated image.

Next, the computing device 200 may instruct the convolution unit 250 to generate at least one feature map by applying the convolution operations to the integrated image. A whole area of the feature map may be divided into an area for verification corresponding to the test pattern and one or more areas for detection, which do not correspond to the test pattern but correspond to the manipulated images.

If the feature map is generated, the computing device 200 may instruct the verification unit 260 to verify the integrity of the convolution unit 250 by referring to values included in the area for verification on the feature map and values included in the output for reference. Herein, the output for reference may be a result of the convolution operations applied to the test pattern by the convolution unit 250 while security level of the computing device is higher than the threshold level as explained in the previous one example embodiment of the present disclosure. The verification unit 260 may verify the integrity of the convolution unit 250 by comparing the values included in the area for verification and the values included in the output for reference.

Also, after the feature map is generated, the computing device 200 may instruct the object detector 270 to generate class information and location information on the objects in the input image by referring to values included in the areas for detection among the whole area of the feature map. A main purpose of generating the integrated image as aforementioned is to improve a performance of object detection. Further, the verification of the integrity of the convolution unit 250, as a secondary purpose, is for fulfilling the main function of the computing device 200 by using the values included in the areas for detection.

Through the stated two embodiments of the present disclosure described above, an integrity of one or more convolution parameters can be verified by using at least one test pattern, while the computing resources required in this verification process can be economized.

The present disclosure has an effect of verifying the integrity of the parameters of the neural network by using the test pattern through the method for economizing computational resources in the verification process while the neural network maintains a performance of its main function as well.

Further, the method in accordance with the present disclosure may be used to reduce annotation costs and to enhance fault tolerance, functional safety on the neural network, and fluctuation robustness in extreme situations, by a computation reduction, a data compression, and the like.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for verifying an integrity of one or more parameters of a neural network by inserting at least one test pattern into at least one background area of at least one input image, comprising steps of:
(a) using a computing device, if information on each of a (t−2)-th image and a (t−1)-th image respectively corresponding to (t−i2)-th frame and (t−i1)-th frame of a video is acquired, instructing at least one background prediction unit to generate t-th background prediction information of a t-th image by referring to the information on said each of the (t−2)-th image and the (t−1)-th image;
(b) the computing device, if the t-th image is acquired, instructing at least one pattern insertion unit to insert the test pattern into the t-th image by referring to the t-th background prediction information, to thereby generate at least one input for verification;
(c) the computing device instructing the neural network to generate at least one output for verification by applying one or more convolution operations to the input for verification; and
(d) the computing device instructing at least one verification unit to determine the integrity of the neural network by referring to the output for verification and at least one output for reference corresponding to the test pattern,
wherein t, i1 and i2 are integer values.

2. The method of claim 1, wherein, at the step of (a), the computing device instructs the background prediction unit to predict a location of a center of a background, corresponding to a background included in the (t−1)-th image and the (t−1)-th image, in the t-th image by referring to (t−2)-th background center information on the t−2th image and (t−1)-th background center information on the (t−1)-th image, to thereby generate the t-th background prediction information.

3. The method of claim 2, wherein, at the step of (a), the computing device instructs the background prediction unit to generate difference information between (i) coordinates of an actual center of at least one (t−2)-th specific background area in the (t−2)-th image and (ii) coordinates of an actual center of at least one (t−1)-th specific background area, corresponding to the (t−2)-th specific background area, in the (t−1)-th image, and the computing device instructs the background prediction unit to generate the t-th background prediction information by referring to the difference information and the coordinates of the actual center of the (t−1)-th specific background area, wherein the coordinates of the actual center of the (t−2)-th specific background area are included in the (t−2)-th background center information, and wherein the coordinates of the actual center of the (t−1)-th specific background area is included in the (t−1)-th background center information.

4. The method of claim 1, wherein, at the step of (b), the computing device instructs the pattern insertion unit to insert the test pattern into the t-th image so that coordinates of a center of the test pattern is located at coordinates of a predicted center of at least one t-th specific background area in the t-th image, wherein the t-th specific background area corresponds to each of the (t−2)-th specific background area and the (t−1)-th specific background area which are respectively included in the (t−2)-th image and the (t−1)-th image, and wherein the coordinates of the predicted center of the t-th specific background area is included in the t-th background prediction information.

5. The method of claim 4, wherein, at the step of (b), the computing device instructs the pattern insertion unit to add at least one zero pattern, whose width corresponds to a size of a convolution kernel of the neural network, to one or more boundaries of the test pattern so that the test pattern does not affect one or more operations applied to the t-th image by the neural network.

6. The method of claim 1, wherein, at the step of (d), the computing device instructs the verification unit to compare values included in the output for reference and values included in at least one specific area, corresponding to the test pattern, among a whole area of the output for verification, and, if at least one of the values included in the specific area is different from its corresponding value included in the output for reference, the computing device instructs the verification unit to determine that at least part of one or more parameters of the neural network has been changed.

7. The method of claim 1, wherein, before the step of (a), if a security level of the computing device is higher than a threshold level, the neural network has generated the output for reference by applying one or more convolution operations to the test pattern.

8. The method of claim 1, wherein, after the step of (c), the method further comprises a step of:
(e) the computing device instructing at least one center calculation unit to calculate coordinates of an actual center of at least one background area in the t-th image.

9. The method of claim 8, wherein, if a (t+1)-th image corresponding to a (t+i3)-th frame in the video is acquired, the coordinates of the actual center of the background area in the t-th image is used when the computing device instructs the background prediction unit to generate (t+1)-th background prediction information on the (t+1)-th image.

10. A method for verifying an integrity of one or more parameters of a convolution unit by inserting at least one test pattern into at least one integrated image generated from at least one input image, comprising steps of:
(a) using a computing device, if the input image is acquired, instructing a target region estimating network to estimate a first target region to an n-th target region on the input image or its one or more resized images, wherein one or more corresponding target objects are estimated as located on each of the first target region to the n-th target region;
(b) the computing device instructing at least one image-manipulating network to generate a first manipulated image to an n-th manipulated image, from the input image or its resized images, each of which corresponds to each of the first target region to the n-th target region and to generate the integrated image by concatenating the first manipulated image to the n-th manipulated image, wherein, at the time of the concatenation, the test pattern is inserted between at least some adjacent manipulated images among the first manipulated image to the n-th manipulated image;
(c) the computing device instructing the convolution unit to generate at least one feature map by applying the convolution operations to the integrated image; and
(d) the computing device instructing at least one verification unit to verify the integrity of the convolution unit by referring to values included in at least one area, corresponding to the test pattern, on the feature map and values included in at least one output for reference corresponding to a result of one or more operations applied to the test pattern by the convolution unit.

11. The method of claim 10, wherein, after the step of (c), the method further comprises a step of:

(e) the computing device, if the feature map is acquired, instructing at least one object detector to generate class information and location information on one or more objects in the input image.

12. The method of claim 10, wherein, at the step of (b), at least one zero pattern is located between the test pattern and each of its adjacent manipulated images in the integrated image, and wherein a width of the zero pattern corresponds to a size of a convolution kernel of the neural network.

13. A computing device verifying an integrity of one or more parameters of a neural network by inserting at least one test pattern into at least one background area of at least one input image, comprising:
at least one memory that stores instructions; and
at least one processor configured to execute the instructions to perform processes of: (I) if information on each of a (t−2)-th image and a (t−1)-th image respectively corresponding to (t−i2)-th frame and (t−i1)-th frame of a video is acquired, instructing at least one background prediction unit to generate t-th background prediction information of a t-th image by referring to the information on said each of the (t−2)-th image and the (t−1)-th image, (II) if the t-th image is acquired, instructing at least one pattern insertion unit to insert the test pattern into the t-th image by referring to the t-th background prediction information, to thereby generate at least one input for verification, (III) instructing the neural network to generate at least one output for verification by applying one or more convolution operations to the input for verification, and (IV) instructing at least one verification unit to determine the integrity of the neural network by referring to the output for verification and at least one output for reference corresponding to the test pattern,
wherein t, i1 and i2 are integer values.

14. The computing device of claim 13, wherein, at the process of (I), the processor instructs the background prediction unit to predict a location of a center of a background, corresponding to a background included in the (t−1)-th image and the (t−1)-th image, in the t-th image by referring to (t−2)-th background center information on the t−2th image and (t−1)-th background center information on the (t−1)-th image, to thereby generate the t-th background prediction information.

15. The computing device of claim 14, wherein, at the process of (I), the processor instructs the background prediction unit to generate difference information between (i) coordinates of an actual center of at least one (t−2)-th specific background area in the (t−2)-th image and (ii) coordinates of an actual center of at least one (t−1)-th specific background area, corresponding to the (t−2)-th specific background area, in the (t−1)-th image, and the processor instructs the background prediction unit to generate the t-th background prediction information by referring to the difference information and the coordinates of the actual center of the (t−1)-th specific background area, wherein the coordinates of the actual center of the (t−2)-th specific background area are included in the (t−2)-th background center information, and wherein the coordinates of the actual center of the (t−1)-th specific background area is included in the (t−1)-th background center information.

16. The computing device of claim 13, wherein, at the process of (II), the processor instructs the pattern insertion unit to insert the test pattern into the t-th image so that coordinates of a center of the test pattern is located at coordinates of a predicted center of at least one t-th specific background area in the t-th image, wherein the t-th specific background area corresponds to each of the (t−2)-th specific background area and the (t−1)-th specific background area which are respectively included in the (t−2)-th image and the (t−1)-th image, and wherein the coordinates of the predicted center of the t-th specific background area is included in the t-th background prediction information.

17. The computing device of claim 16, wherein, at the process of (II), the processor instructs the pattern insertion unit to add at least one zero pattern, whose width corresponds to a size of a convolution kernel of the neural network, to one or more boundaries of the test pattern so that the test pattern does not affect one or more operations applied to the t-th image by the neural network.

18. The computing device of claim 13, wherein, at the process of (IV), the processor instructs the verification unit to compare values included in the output for reference and values included in at least one specific area, corresponding to the test pattern, among a whole area of the output for verification, and, if at least one of the values included in the specific area is different from its corresponding value included in the output for reference, the processor instructs the verification unit to determine that at least part of one or more parameters of the neural network has been changed.

19. The computing device of claim 13, wherein, before the process of (I), if a security level of the processor is higher than a threshold level, the neural network has generated the output for reference by applying one or more convolution operations to the test pattern.

20. The method computing device of claim 13, wherein, after the process of (III), the processor further performs a process of: (V) instructing at least one center calculation unit to calculate coordinates of an actual center of at least one background area in the t-th image.

21. The computing device of claim 20, wherein, if a (t+1)-th image corresponding to a (t+i3)-th frame in the video is acquired, the coordinates of the actual center of the background area in the t-th image is used when the processor instructs the background prediction unit to generate (t+1)-th background prediction information on the (t+1)-th image.

22. A computing device for verifying an integrity of one or more parameters of a convolution unit by inserting at least one test pattern into at least one integrated image generated from at least one input image, comprising:
at least one memory that stores instructions; and
at least one processor configured to execute the instructions to perform processes of: (I) if the input image is acquired, instructing a target region estimating network to estimate a first target region to an n-th target region on the input image or its one or more resized images, wherein one or more corresponding target objects are estimated as located on each of the first target region to the n-th target region, (II) instructing at least one image-manipulating network to generate a first manipulated image to an n-th manipulated image, from the input image or its resized images, each of which corresponds to each of the first target region to the n-th target region and to generate the integrated image by concatenating the first manipulated image to the n-th manipulated image, wherein, at the time of the concatenation, the test pattern is inserted between at least some adjacent manipulated images among the first manipulated image to the n-th manipulated image, (III) instructing the convolution unit to generate at least one feature map by applying the convolution operations to the integrated image, and (IV) instructing at least one verification unit to verify the integrity of the convolution unit by referring to values included in at least one area, corresponding to the test pattern, on the feature map and values included in at least one output for reference corresponding to a result of one or more operations applied to the test pattern by the convolution unit.

23. The computing device of claim 22, wherein, after the process of (III), the processor further performs a process of: (V) if the feature map is acquired, instructing at least one object detector to generate class information and location information on one or more objects in the input image.

24. The computing device of claim 22, wherein, at the process of (II), at least one zero pattern is located between the test pattern and each of its adjacent manipulated images in the integrated image, and wherein a width of the zero pattern corresponds to a size of a convolution kernel of the neural network.

* * * * *